(12) United States Patent
Nikolajevic et al.

(10) Patent No.: US 7,515,874 B2
(45) Date of Patent: Apr. 7, 2009

(54) DIRECTIVITY OPTIMIZATION FOR SHORT-RANGE WIRELESS MOBILE COMMUNICATION SYSTEMS

(75) Inventors: Vladimir Nikolajevic, Stuttgart (DE); Masahiro Uno, Fellbach (DE)

(73) Assignee: Sony Deutschland GmbH, Cologne (DE)

( * ) Notice: Subject to any disclaimer, the term of this patent is extended or adjusted under 35 U.S.C. 154(b) by 0 days.

(21) Appl. No.: 10/544,166

(22) PCT Filed: Jul. 13, 2005

(86) PCT No.: PCT/EP2005/007626

§ 371 (c)(1),
(2), (4) Date: Oct. 16, 2006

(87) PCT Pub. No.: WO2006/039954

PCT Pub. Date: Apr. 20, 2006

(65) Prior Publication Data

US 2007/0054617 A1    Mar. 8, 2007

(30) Foreign Application Priority Data

Oct. 11, 2004    (EP) .................................. 04024196

(51) Int. Cl.
*H04B 7/00*    (2006.01)
(52) U.S. Cl. .................. 455/41.2; 455/63.4; 455/456.1; 455/456.6; 455/556.1; 455/25; 342/126; 342/146; 342/78; 342/352; 342/359; 343/702; 343/790

(58) Field of Classification Search ................. 455/41.2, 455/63.4, 115.4, 456.1, 456.6, 25, 266, 556.1; 342/126, 146, 352, 359, 78, 367; 343/702, 343/790
See application file for complete search history.

(56) References Cited

U.S. PATENT DOCUMENTS

| | | | | |
|---|---|---|---|---|
| 3,897,151 | A * | 7/1975 | Lecroy | 356/5.05 |
| 5,701,583 | A * | 12/1997 | Harbin et al. | 455/25 |
| 6,229,481 | B1 * | 5/2001 | Katz | 342/367 |
| 6,885,847 | B1 * | 4/2005 | Lumelsky | 455/41.2 |
| 7,062,296 | B2 * | 6/2006 | Brennan et al. | 455/562.1 |
| 2003/0236096 | A1 * | 12/2003 | Yamazaki | 455/456.6 |
| 2006/0012476 | A1 * | 1/2006 | Markhovsky et al. | 340/539.32 |

* cited by examiner

*Primary Examiner*—Lana N. Le
*Assistant Examiner*—Muhammad Akbar
(74) *Attorney, Agent, or Firm*—Oblon, Spivak, McClelland, Maier & Neustadt, P.C.

(57) ABSTRACT

The present invention provides a short-range wireless mobile communication system with a first terminal and a mobile terminal that are each adapted for transmitting and receiving an information carrying signal wave, whereby at least the first terminal or the mobile terminal comprise a directional signal wave converter for transmitting and/or receiving the information carrying signal wave with a directional characteristic and a control means for controlling the directional characteristic according to a position of the mobile terminal relative to the first terminal.

13 Claims, 7 Drawing Sheets

DIRECTIVITY OPTIMIZATION FOR SHORT-RANGE WIRELESS MOBILE COMMUNICATION SYSTEMS

Figure 1:
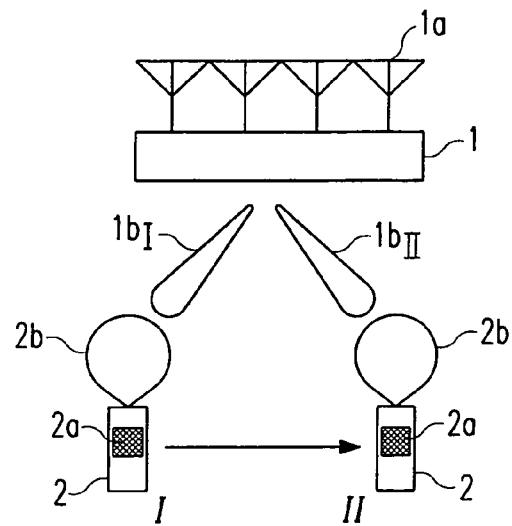

The present invention relates to a signal transmission in short-range wireless communication systems wherein at least one of the communication terminals is subject to move at random.

A short-range wireless mobile communication system commonly forms an integral part of a short-range wireless network, where an access point terminal is provided to enable one or more mobile terminals to wirelessly connect to the network. The range of a respective system is usually limited to a few meters like, e.g. 2-10 meters. Mobile short-range wireless communication is further utilized in wireless ad-hoc networks, where wireless links can be established directly between two nodes like e.g. a Personal Digital Assistant and a printing or displaying device.

If only transceivers with an omnidirectional, i.e. an angular-independent radiation characteristic are used in a short-range wireless mobile communication system, the quality of the signal transmission established is often impaired due to multipath fading. This is caused by the fact that the information carrying signal wave like e.g. a radio or light wave does not only propagate along the direct path from a transmitter to a receiver through free-space, but more likely along a multitude of additional and alternative paths by being reflected, refracted or scattered off objects located within the transmission range. The amplitude of each individual signal wave is attenuated according to the loss along its individual propagation path. The various signal waves from the different individual paths add for most of the part destructively, thereby degrading the received signal by causing for instance intersymbol interference.

A common way to improve the quality of the signal transmission is to use at least one directional, i.e. angular-sensitive signal wave converter allowing confining the signal transmission to a low-loss transmission path with only little or no interference. A respective transmission path is in the following referred to as a 'direct-link path'.

The term 'signal wave converter' further used in this specification describes a means for converting a space wave into a line bound wave and/or vice versa. Its physical embodiment is strongly dependent on the kind of wireless signal transmission employed.

For a wireless signal transmission based on radio waves, a signal wave converter takes on the form of an antenna. The antenna converts a signal in form of a line bound wave provided through a feeding line into an air wave that is emitted into at least a limited space segment of the antenna environment. Upon receiving an airwave, the antenna converts the airwave into a line bound wave propagating through the connecting line to a signal processing circuitry.

In case of a wireless communication being based on an optical transmission of signals however, a signal wave converter is typically formed by an electro-optical device or an optical coupler that is adapted to convert light propagating through open space into a signal wave propagating through an electrical line or an optical fiber or vice versa.

The expression 'directional signal wave converter' is used to describe a signal wave converter with a directional radiation characteristic or directional characteristic, respectively, where the signal power radiated or received shows an angular distribution. It is sometimes also referred to as a sharp beam signal wave converter for indicating that the space wave radiation is received from or transmitted into a limited solid angle only. Likewise, a signal wave converter with an omnidirectional radiation pattern is often referred to as a wide beam signal wave converter for making reference to the practically direction-independent sensitivity of the converter The effective angular segment for a directional signal transmission is defined by the Half Power Beam Width (HPBW) of the directional signal wave converter, i.e. the opening angle of the main lobe defined by the angular range wherein the radiated power or the sensitivity to irradiated power, respectively, has not dropped below half its maximum.

As mobile terminals are usually subject to move at random, a high quality of the signal transmission in a short-range wireless mobile communication system with directional signal wave converters usually requires a tracking of the direct link path. The radiation angle of the signal wave converter, i.e. the direction of maximum power of its main lobe, is hereby aligned into the direction of the direct link path. If the relative direction between two communicating nodes in the short-range wireless mobile network changes, the main lobe is realigned to a corresponding new direct link path.

This is usually achieved by either changing the orientation of a directional signal wave converter mechanically or by using an adaptive signal wave converter array, wherein many converter elements forming an array are interconnected through phase shifters with each individual phase shift being tuned to achieve the desired angular radiation pattern of the array. Both types of signal wave converters will in the ongoing be addressed as steering converters in close relation to the common steering antenna for radio waves.

Assumed, that a communication of sufficient link budget is to be set-up between a mobile terminal which is equipped with an omnidirectional signal wave converter and a further terminal with a directional signal wave converter, then the directional signal wave converter has to be controlled for its main lobe constantly tracking the movement of the mobile terminal to be at any time aligned with the direct link path as schematically shown in FIG. 1. The generic term 'link budget' in this context describes a series of mathematical calculations designed to model the performance of a communication link with respect to signal strength and noise power. In the following, the terminal denoted as further terminal above will be referred to as access point as this is the usual configuration in short-range wireless networks. But it is clear from the explained above that any type of terminal can substitute an access point.

The realignment of the radiation angle is usually to be accomplished for a three-dimensional movement of a mobile terminal. This means that the radiation angle of a signal wave converter has to be changed in the vertical as well as in the horizontal plane. In other words, both, the azimuth ($\phi$) and the elevation ($\theta$) of the radiation angle have to be realigned for tracking a moving mobile terminal.

But the adaptation must not necessarily be performed continuously. For covering all possible directions, the radiation angle only has to be aligned in certain steps defined by the half power beam width (HPBW), i.e. the opening angle of the main lobe defined by the angular range wherein the radiation power has −3 dB reduction from the maximum.

Figure 3:
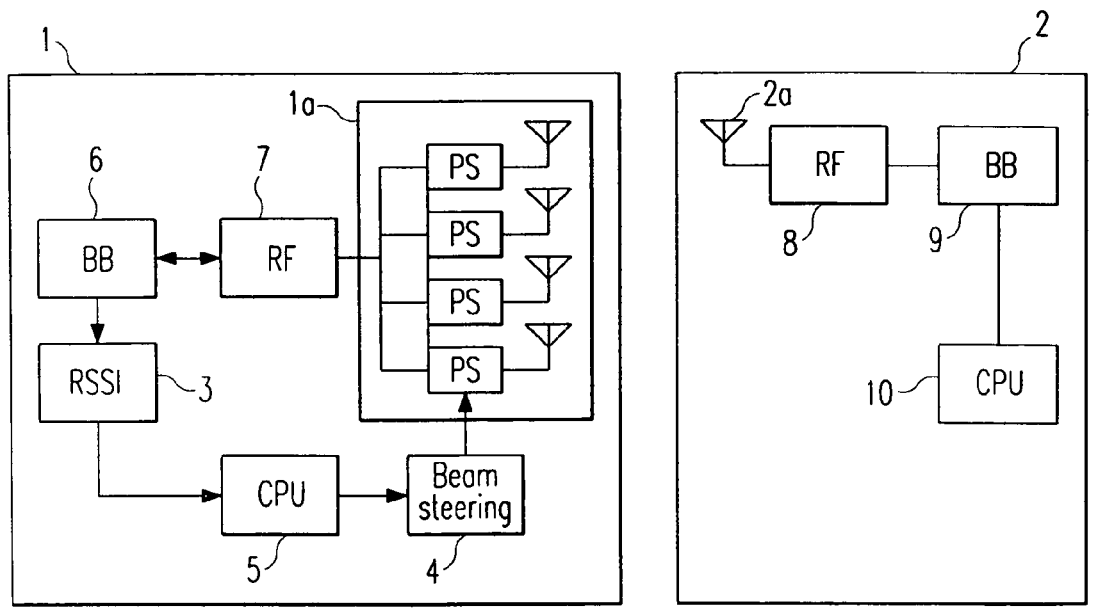
Figure 4:
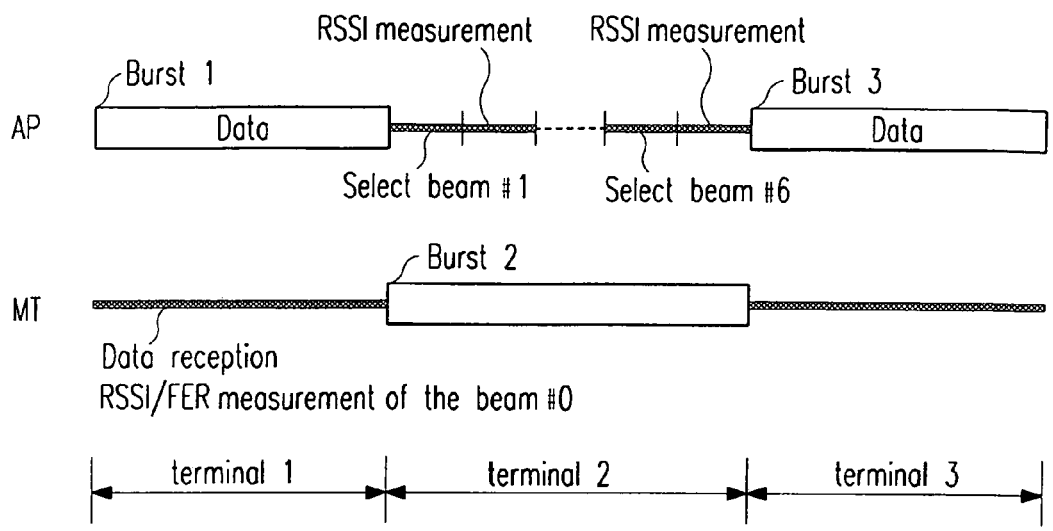

A tracking of the mobile terminal is currently achieved by a system, which is illustrated in form of a schematic block diagram in FIG. 3. The corresponding frame structure is shown in FIG. 4 and the procedure followed by the system in FIG. 5. After a communication link is established between the access point and the mobile terminal, a first burst (Burst 1) is transmitted from the access point to the mobile terminal whereby the radiation angle of the access point's signal wave converter is in a first position (#0). The mobile terminal receives the data contained in the burst and determines from it the RSSI (Received Signal Strength Indicator) value and the FER (Frame Error Rate). Following the first burst, the mobile terminal transmits a second burst (Burst 2) which is used by the access point to perform an RSSI and possibly a FER measurement for various radiation angles (e.g. #1 to #6 in FIG. 12) of its steering signal wave converter. The main lobe direction with the best RSSI (and FER, if measured) performance is then used for the subsequent data transmission beginning with Burst 3 transmitted from the access point to the mobile terminal.

The time duration of Burst 2 depends on the number of the beam directions for the RSSI measurements tested by the access point. The more possible radiation directions are to be tested, the longer the time period, which will be required for Burst 2. If, e.g. the HPBW of the access point's main lobe is such, that 7 beam directions are necessary to cover all possible directions between the access point and the mobile terminal, the time period required for Burst 2 is seven times the time required to perform the measurements for determining the communication link quality and to readjust the radiation angle to a new direction. This leads to an expansion of the system overhead and requires a corresponding reduction of the payload length.

Particularly when using a mechanical steering signal wave converter, any realignment of the radiation angle is rather slow due to the speed limitation of the mechanical function. Therefore it might not be possible to check all possible directions of the signal wave converter within one Burst 2 but only one. This means that the number of successive Bursts 2 required for the readjustment corresponds to the number of possible directions, which have to be checked. A corresponding tracking will therefore show a sluggish behavior.

The tracking speed, i.e. the angular velocity of a main lobe required to keep track of a moving mobile terminal is furthermore also a function of the distance between the two communicating terminals; at least as far as the direction transverse to the main lobe direction is concerned. For short distances between communicating terminals, the tracking speed required is regularly too high to be kept up by conventional beam tracking systems.

It is therefore an object of the present invention to provide a short-range wireless mobile communication system with a beam tracking according to a movement of a mobile terminal, which does not negatively affect the payload capacity and is reliable even for fast shifting transmission links over very short distances.

This object is achieved by the invention as defined in the independent claims. Further developments are set forth in the dependent claims.

The above object is particularly achieved by a short-range wireless mobile communication system with a first terminal and a mobile terminal that are each adapted for transmitting and receiving an information carrying signal wave, whereby at least the first terminal or the mobile terminal comprise a directional signal wave converter for transmitting and/or receiving the information carrying signal wave with a directional characteristic and a control means adapted for controlling the directional characteristic according to a position of the mobile terminal relative to the first terminal.

The above object is further achieved by a terminal for a short-range wireless mobile communication system, comprising a directional signal wave converter for transmitting and/or receiving an information carrying signal wave with a directional characteristic and a control means adapted for controlling the directional characteristic according to a position of the terminal relative to a further terminal of the short-range wireless mobile communication system.

Controlling the directional characteristic of the signal wave converter of at least one of the terminals enables a very versatile adaptation to virtually any ambient situation the short-range wireless mobile communication system might be set in.

As the likelihood for multipath fading increases with increasing distance between the first terminal and the mobile terminal, the requirements for a directional signal wave transmission at shorter distances between the two communicating terminals are consequently less challenging. In a special embodiment of present invention uses this insight advantageously to relax the requirements for the tracking speed when the mobile terminal is in close proximity to the other terminal. This is achieved by a control means that is adapted to control the Half Power Beam Width of the directional characteristic depending on the distance between the first terminal and the mobile terminal. The reduction of the overhead necessary for the beam tracking achieved hereby advantageously allows a higher communication data rate. As the beam tracking is slowed down or even stopped in the close range, also the overall power consumption can be reduced.

In a further preferred embodiment of the present invention, the control means comprises a movement monitoring means for monitoring a movement of the mobile terminal relative to the first terminal and a direction adjustment means for adjusting the directional characteristic of the controllable directional signal wave converter according to the movement of the mobile terminal relative to the first terminal as monitored by the movement monitoring means. Aligning the radiation angle of the directional signal wave converter based on a monitoring of the mobile terminal's movement relative to the first terminal spares the checking out of all possible orientations, which will reduce the time required for the realignment considerably. Further, by continuously monitoring the movement of the terminals relative to each other, the present invention enables a faster overall tracking speed and also a use of mechanically steered directional signal wave converters.

In a further embodiment of the present invention, the control means increases the Half Power Beam Width of the directional characteristic from a first value to a second value upon the distance between the first terminal and the mobile terminal falling short of a pre-defined distance value. By this technique, the beam tracking can be adapted to the relative distance between the two communicating terminals in discrete steps, which may represent distances critical for the operation of the system. According to a further preferred embodiment, the Half Power Beam Width of the second value hereby conforms to the range of directions allowed between the first terminal and the mobile terminal, so that no beam steering is required for the wireless communication when taking place in the close range. Hereby, a directional characteristic with the Half Power Beam Width of a second value corresponds advantageously to an omnidirectional characteristic in order to avoid any restrictions with respect to a possible arrangement of the two terminals.

According to an advantageous development, the short-range wireless mobile communication system is equipped with a distance determination means for determining the distance between the first terminal and the mobile terminal thereby allowing a precise determination of a close range communication condition. The distance determination means may suitably comprise an ultrasonic distance measurement system and/or an optical distance measurement system providing reliable distance determination based on physical methods. Alternatively or additionally, the distance determination means is adapted to determine the distance between the first terminal and the mobile terminal based on a Received Signal Strength Indicator (RSSI) value enabling a distance determination based on a signal characteristic interpretation.

The distance determination means is preferably located on the first terminal allowing the use of mobile terminals with simple antenna structures.

By placing the movement monitoring means on the mobile terminal and/or the first terminal, a movement of the respective terminal is favourably registered directly. A registration of the movement can be effectively accomplished by the movement monitoring means comprising a sensor means, which is adapted to provide one or more electrical signals corresponding to one or more physical quantities which are related to a movement of the mobile terminal relative to the first terminal. The sensor means may hereby further advantageously comprise an acceleration sensor for providing an electrical signal indicating an acceleration value associated with a movement of the terminal housing the sensor means, since any change in the velocity or direction of a movement is associated with an acceleration. In a preferred embodiment of the present invention, the sensor means is equipped with a gyroscope sensor adapted to provide an electrical signal indicating an orientation value associated with the movement of the terminal housing the sensor means thus enabling an easy compensation of the radiation angle with respect to the rotational portion of the terminal's movement.

Preferably, the movement monitoring means provides tracking data to a direction calculation means, whereby the tracking data are based on a movement monitored for a terminal which houses the respective movement monitoring means. This enables an easy to perform numerical calculation of a required direction alignment of one or more signal wave converters according to the movement as monitored. To achieve the correct alignment of the directional signal wave converter at the time of the next following data exchange, the direction calculation means estimates the position of the mobile terminal relative to the first terminal for the time of the next following exchange of information carrying signals. A versatile direction control is achieved by the direction calculation means providing a control signal to the direction adjustment means which is based on the tracking data and which is adapted to adjust the controllable directional signal wave converter such that a reliable signal transmission is achieved.

As multipath interference can already be avoided by either directing the transmitted signal along a direct link path or by aligning the radiation angle of the receiving signal wave converter along a direct link path, a reliable data transmission can be effected by the mobile terminal comprising an omnidirectional signal wave converter and the first terminal comprising a controllable directional signal wave converter or alternatively by the first terminal comprising an omnidirectional signal wave converter and the mobile terminal comprising a controllable directional signal wave converter.

Particularly, when a wide range for adjusting the radiation angle is required, a mechanical steerable directional signal wave converter preferably forms the controllable directional signal wave converter. For a fast scan speed of the radiation angle alignment, the controllable directional signal wave converter is advantageously formed by an adaptive signal wave converter array.

The information carrying signal wave is preferably either formed by a light wave or by a radio wave as both media are perfectly suited for a short-range wireless communication. Depending on the situation, i.e. the type of protocols and the type of devices used for the short-range wireless communication, the signal wave converter both on the first terminal and the mobile terminal are each adapted for transmitting and receiving information in form of a radio wave and/or light wave. Particularly, when the communication is based on radio waves, the signal wave converter is effectively formed by an antenna, while for a light wave based communication electro-optical devices are preferred as part of the signal wave converters.

With the first terminal being formed as a stationary terminal, the movement monitoring means can be advantageously reduced to monitoring the movement of the mobile terminal only. The first terminal may hereby be used as an access point for a wired network.

It is to be noted that the terms 'comprises' and 'comprising' when used in this specification are taken to specify the presence of stated figures, integers, steps or components, but do not preclude the presence or addition of one or more other features, integers, steps, components or groups thereof.

Figure 2:
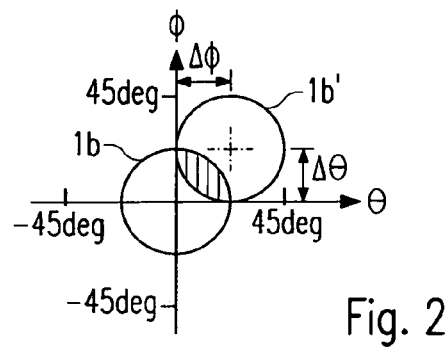
Figure 5:
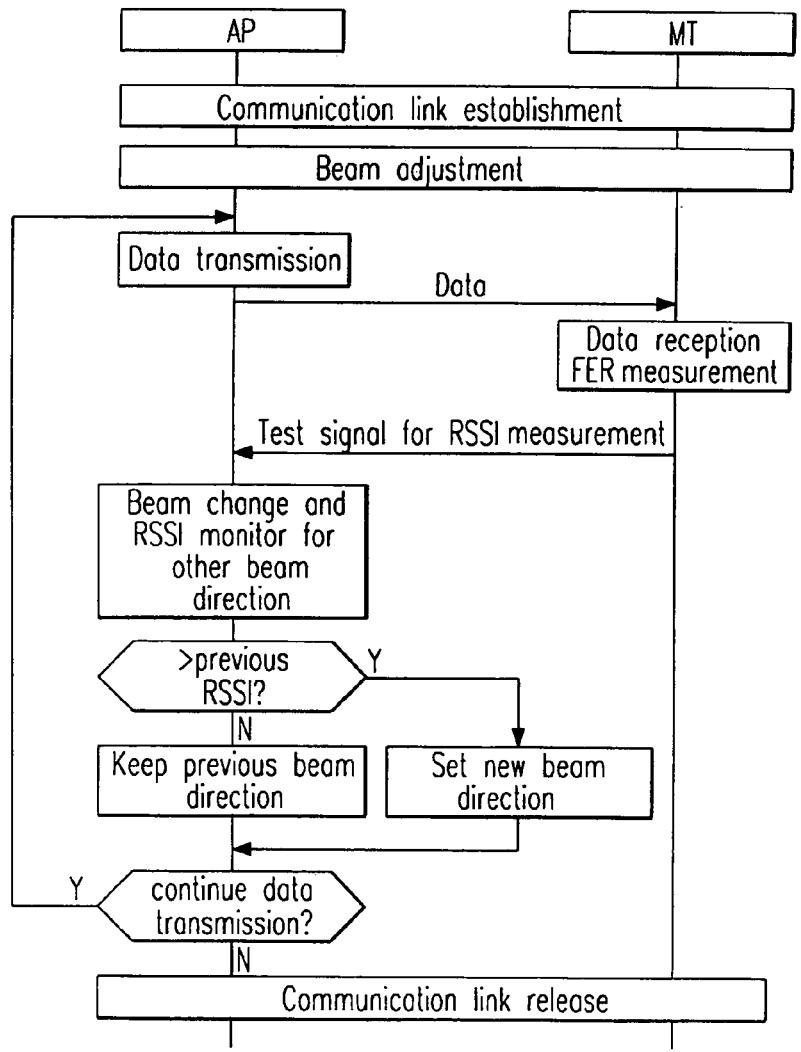
Figure 6:
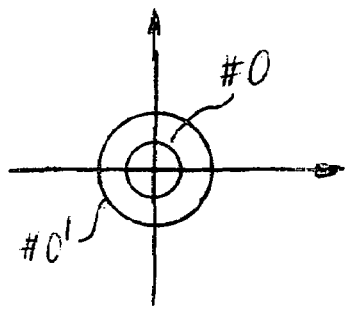
Figure 7:
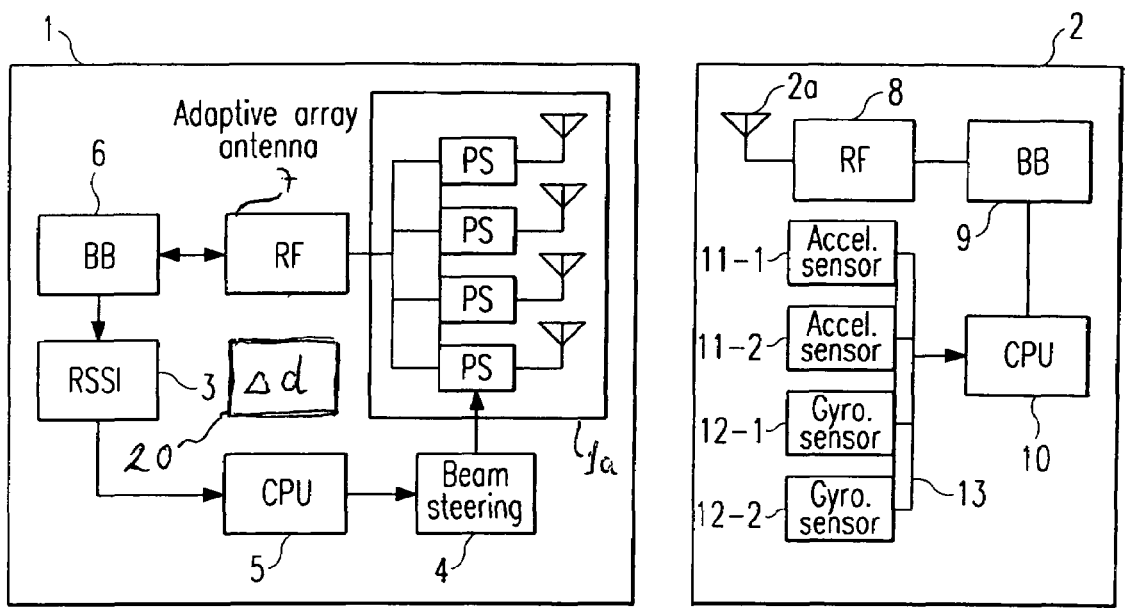
Figure 8:
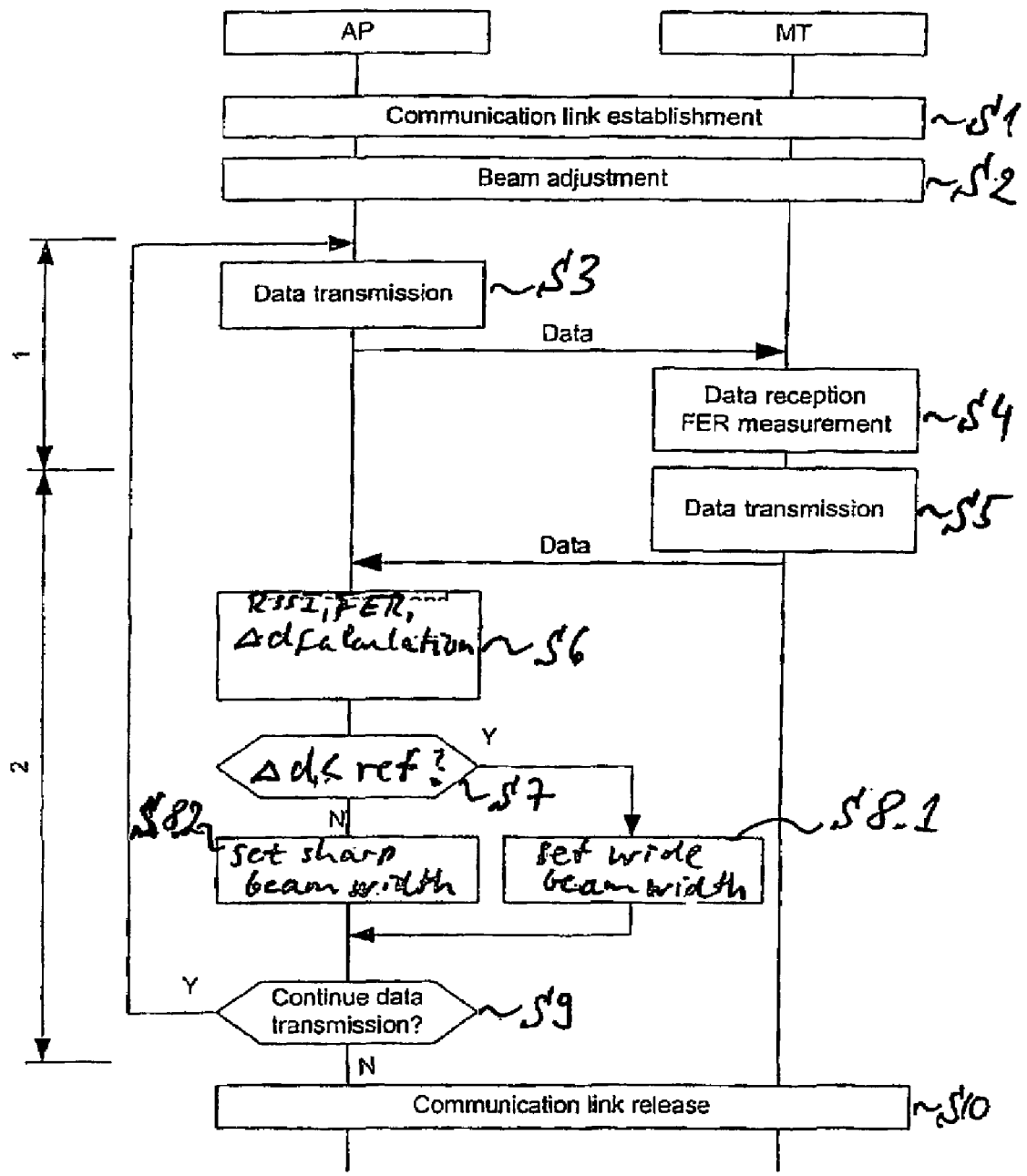
Figure 9:
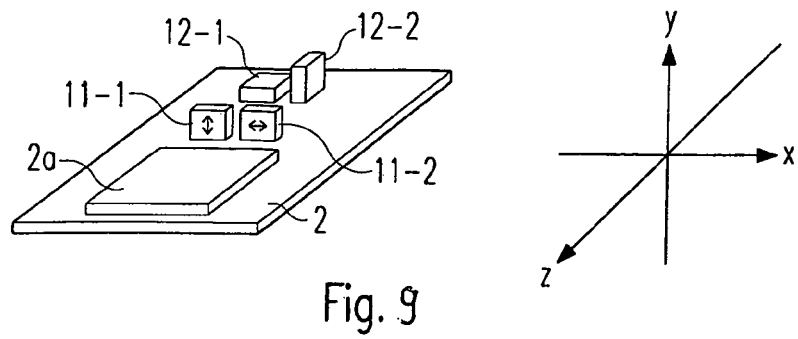
Figure 10:
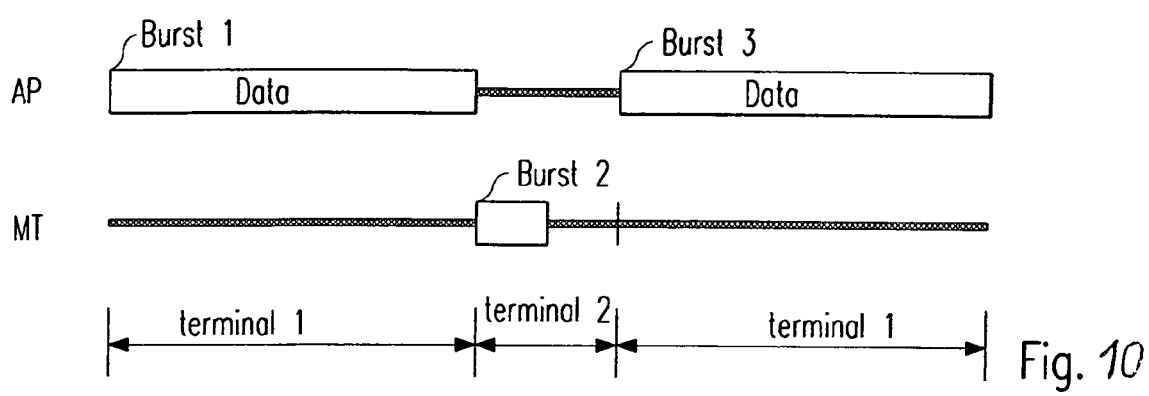
Figure 11:
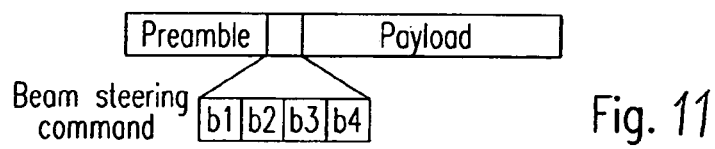
Figure 12:
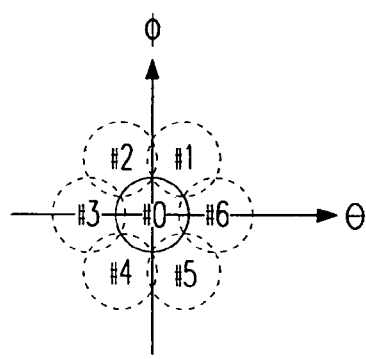
Figure 13:
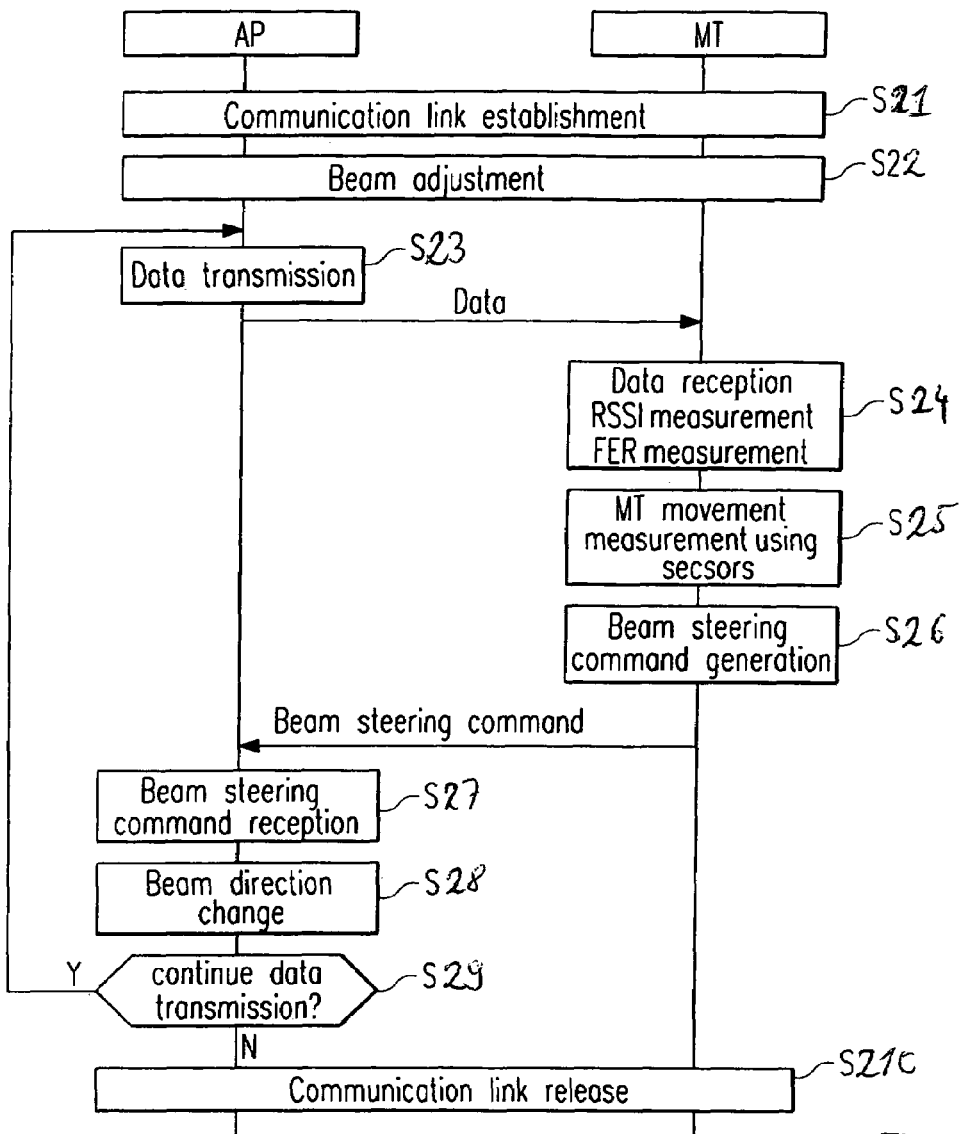
Figure 14:
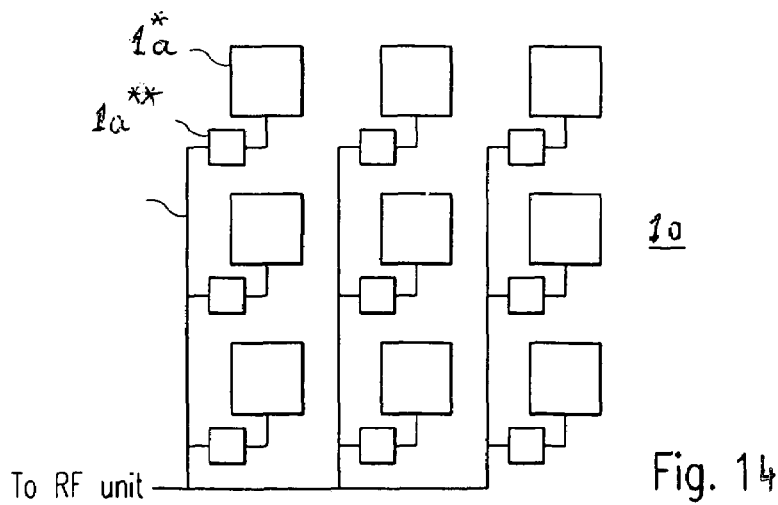
Figure 15:
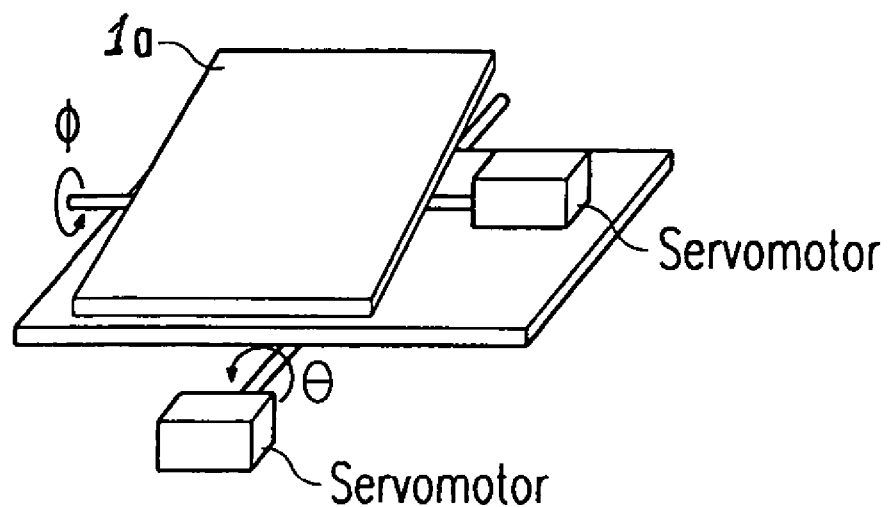
Figure 16:
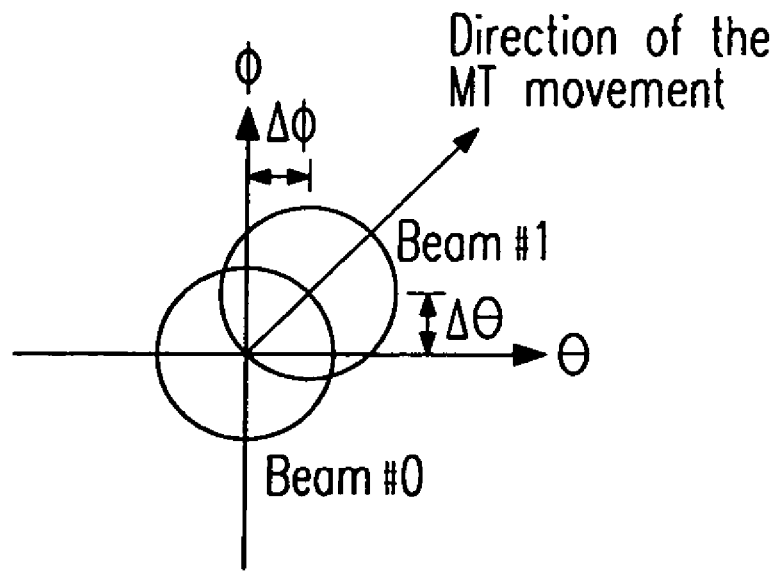

In the following description, the present invention is explained in more detail with respect to special embodiments and in relation to the enclosed drawings, in which FIG. 1 is a schematic overall view of a short-range wireless mobile communication system with a steering antenna for tracking a mobile terminal, FIG. 2 shows the relation between radiation range, half power beam width, and radiation angle in the azimuth-elevation-angle-plane, FIG. 3 shows a block diagram of a prior art beam tracking system, FIG. 4 shows a state of the art frame structure used for beam tracking, FIG. 5 shows the processing steps of a prior art beam tracking method, FIG. 6 shows the radiation angle for a sharp beam #0 in comparison to that of a wide beam #0', FIG. 7 shows a short-range communication system according to the present invention, FIG. 8 shows the processing steps for a beam tracking according to a first aspect of the present invention, FIG. 9 shows a mechanical arrangement corresponding to a sensor means according to the present invention, FIG. 10 shows a frame structure of a tracking system according to a second aspect of the present invention, FIG. 11 shows the components of a burst used for tracking purposes according to a second aspect of the present invention, FIG. 12 shows the coverage of a certain radiation range with a limited number of radiation angles in the azimuth-elevation-angle-plane, FIG. 13 shows the processing steps of a beam tracking method according to the present invention, FIG. 14 shows an example of an adaptive antenna array, FIG. 15 shows an example of a mechanical beam steering antenna, and FIG. 16 illustrates the concept of an incremental relative beam alignment in the azimuth-elevation-angle-plane.

The basic concept for a short-range wireless mobile communication system with beam tracking for a low-loss, low-signal-interference communication is shown in FIG. 1. A first terminal 1, formed for instance by an access point to a wired network, transmits and receives signals to and from a mobile terminal 2 by means of a signal wave converter 1a with a directional characteristic. The mobile terminal 2 likewise contains a signal wave converter 2a, but in the example shown in FIG. 1 of omnidirectional characteristic 2b. While the mobile terminal 2 moves from a first position I to a second position II, the directional characteristic 1$b_I$ of the first terminal's signal wave converter 1a is realigned to a directional characteristic 1$b_{II}$, with its main lobe now being adjusted into the direction of the mobile terminal in position II. In other words, while the mobile terminal moves from position I to position II, the radiation angle of the signal wave converter 1a follows the movement until finally being oriented to the second position II.

In the example shown in FIG. 1, the transmitted signal on which the communication is based can propagate unimpeded through free space from the transmitter to the receiver. In case that the transmission along the line-of-sight is disabled by some objects, the directional radiation characteristics $1b_I$ and $1b_{II}$, respectively, will be aligned along a respective direct link path as explained above.

Further, the antenna arrangement shown in FIG. 1 is not mandatory. It is as well possible to use a signal wave converter 2a with a directional radiation characteristic on the mobile terminal 2 and an omnidirectional signal wave converter 1a with the first terminal 1, or to use directional signal wave converters on both terminals.

A short-range wireless mobile communication as shown in FIG. 1 is usually based on a signal transmission using radio or light waves as carrier.

When using radio transmission, the signal wave converters 1a and 2a have the form of an antenna. Usually rod-like, helical or patch-like antennas are used for implementing an omnidirectional or wider beam radiation characteristic. Directional antennas have most different designs, whereby phased array antennas are usually preferred due to their small size. The control of the radiation angle is hereby either achieved by mechanically tilting the antenna array as shown in FIG. 15 or by tilting each element of the array as e.g. described in "A V-Band Micromachined 2-D Beam-Steering Antenna Driven by Magnetic Force With Polymer-Based Hinges, Chang-Wook et al, IEEE Transactions on Microwave Theory and Techniques, Vol. 51, No. 1, January 2003" which is herewith incorporated by reference, or by electronically tuning the phase shifts for each antenna element $1a^*$ with phase shifters $1a^{**}$ as shown in FIG. 14 to pivot the radiation angle of the antenna array 1a.

When using optical signal transmission, the signal wave converter for transmitting a signal is usually different from that for receiving the signal. For a transmission, devices that convert electrical energy into optical radiation, i.e. light emitting devices, are generally preferred like e.g. LED's or laser diodes. For a reception of optical signals photovoltaic detectors like e.g. photodiodes are typically employed to convert optical radiation into electrical energy.

Most light emitting devices show a directional characteristic. The radiation angle is either modified by tilting the complete device or by deflecting the light rays on a reflecting surface. The emission angle of a light-emitting device can be modified by a lens or a set of lenses to form a narrow or a wide beam. An omnidirectional characteristic is in general only achievable with a set of differently oriented devices, special optics and/or scattering elements.

Most of the conventional photovoltaic detectors have a nearly hemispherical (ir) radiation characteristic. To get a small angle or sharp beam response, some optic is placed in front of it. The deflection of the radiation angle, i.e. the direction of the solid angle from which irradiation is accepted, may be achieved by either directly tilting the device or by using a mirror or array of mirrors enabling a pivoting of the radiation angle into the reception path.

Referring back to a short-range wireless mobile communication system like the one shown in FIG. 1, it is to be noted that an exact alignment of the directional signal wave converter's radiation angle to a direct link path it not necessarily required for an interference-free system operation. Each directional characteristic of the converter can be described by a main lobe, i.e. the angular distribution of the emitted or received energy which HPBW defines the beam width. Movements within the HPBW of the signal wave converter cause in practice no changes of the transmission quality.

A realignment based on a determination of a transmission quality value like e.g. an RSSI (Received Signal Strength Indicator) value, will therefore most likely take place in discrete steps as shown in FIG. 2, wherein the coverage of an extended space segment with only two radiation angles (position I with $\phi=0°=\theta$ and position II with $\phi=22.5°=\theta$) is shown for an HPBW of 45°. While a mobile terminal 2 moves from position I to position II, the first terminal 1 will regularly check the transmission quality, which will only drop significantly when the mobile terminal 2 moves close to the edge of the main lobe $1b_I$ for the first position I. Only then the radiation angle will be realigned for the new position II with a corresponding main lobe $1b_{II}$ (changing from lobe 1b to 1b').

FIG. 4 shows a frame structure used in a short-range wireless communication system implementing a respective beam tracking. The frames illustrated in the upper part of FIG. 4 are transmitted by the terminal 1 equipped with a directional signal wave converter 1a like for instance an access point to a wired network and in the Figure denoted as AP. The frames shown in the lower part of the Figure are to be transmitted by the other communication terminal denoted MT. Terminal AP transmits the first data burst (Burst 1) to the other terminal MT that is thereon used to determine the RSSI value and the FER (Frame Error Rate) for the beam direction just applied. The expression 'beam direction' is hereby used to describe the directional characteristic of the signal wave converter with respect to its current radiation angle.

Following Burst 1, the other terminal MT sends back a second burst (Burst 2) which contains data enabling terminal AP to select the beam direction with the lowest interference. Burst 2 may contain further data like e.g. the results of the RSSI and FER determination or data referring to its current position or the like, which may assist terminal AP in determining its position relative it. During Burst 2, terminal AP measures the RSSI and FER values for all possible beam directions or a selection thereof. These values are used in a tracking algorithm to select the beam direction with the lowest interference. The processing time required for the analysis and the energy consumed for it depend strongly on the number of possible beam directions.

An example for coverage of a certain radiation range with a limited number of beam directions is illustrated in the azimuth-elevation plane shown in FIG. 12. Assumed that the HPBW of the directional characteristic is for example 45°, a half space can be covered by using seven beam directions only. The step size $\Delta\theta$, $\Delta\phi$ from one beam direction thus corresponds for example to about 5° for each direction $\theta$ and $\phi$, respectively. All beam directions are to be checked within the time period allowed for Burst 2 before the data transfer can continue on the optimum beam direction in Burst 3. For smaller beam widths the number of directions, which are to be checked, increases.

Beam directions have to be changed for the mobile terminal 2 moving transverse to the radiation direction of the directional signal wave converter. The angular speed of the beam tracking is hereby higher when the mobile terminal 2 is closer to the other terminal 1 being the counterpart of the communication. For a mobile terminal 2 moving randomly and at a very close distance with respect to the other terminal 1, the conventional beam tracking described will not be able to align the beam direction of the directional signal wave converter along a direct link path at any time, as the realignment process will be too slow, particularly when a large number of possible beam directions have to be examined.

The possibility of signal interference by multipath fading or direct path blocking is on the other hand greatly reduced for the two communicating terminals positioned in close proximity to each other. The present invention is based on the insight that the likelihood for the occurrence of intersymbol interference due to multipath fading depends in a short-range wireless mobile communication system on the distance between the two communicating terminals. According to one of the basic concepts of the invention, the beam width of a directional signal wave converter like e.g. a directional antenna is adapted to the multipath fading likelihood corresponding to a distance between the mobile terminal 2 and the further terminal of the wireless communication by modifying it depending on the distance.

As the conventional beam tracking is too slow only for short distances between the involved terminals, a critical distance is preferably defined below which the beam width, i.e. the HPBW of the directional characteristic of the signal wave converter is increased like e.g. illustrated in FIG. 6. The increased beam width #0' results in a reduced number of beam directions required for covering the same radiation range as before. Consequently, the number of beam directions to be tested can be reduced accordingly thereby enabling a faster identification of the best suited beam direction by the beam tracking algorithm allowing a shorter time required for Burst 2 and a more reliable tracking of a transverse movement of a close by mobile terminal 2, even at higher speeds.

The distance between the two communicating terminals 1 and 2 can be estimated from the RSSI and FER values obtained within a Burst 2 for different beam directions as well as from or in combination with a field strength determination of the received information carrying signal wave. Alternatively or complementary, the distance is measured by using an ultrasonic or optical distance measurement system or the like. Indoor and/or outdoor positioning systems may be used just as well.

FIG. 7 shows the components of a short-range wireless mobile communication system according to the present invention. One terminal of the system, that is terminal 1 in the representation, is equipped with a directional signal wave converter 1a. The other terminal 2 is equipped with an omni-directional signal wave converter 2a. The operation is on each terminal controlled by a Central Processing Unit, CPU 5 and 10, respectively. Baseband processing is performed on terminal 1 by baseband processing unit 6, on terminal 2 by baseband processing unit 9. An RF (Radio Frequency) circuitry is provided on each terminal for modulating and demodulating the signal carrier wave supplied to or received from the signal wave converter of the respective terminal with respect to the baseband signal.

In the example given in FIG. 7, beam tracking is implemented on terminal 1. The directional signal wave converter 1a is shown to have the form of an adaptive array antenna wherein a phase shifter is preconnected to each individual antenna element for controlling the radiation angle as well as the HPBW of the antenna array 1a. The individual phase shifts applied to each antenna element and the antenna pattern are controlled by a beam steering control 4, which acts on information supplied to it from CPU 5. It is also possible to use a mechanical beam steering antenna instead of an adaptive array antenna.

The mobile terminal 2 of FIG. 7 is equipped with an omni-directional antenna. It is also possible to have a directional steering antenna on the mobile terminal, while the first terminal utilizes an omnidirectional antenna. Further, both terminals may be equipped with a directional steering antenna, which implies that both terminals comprise a direction adjustment means 4. This is particularly useful for a short-range communication between multitudes of terminals where each terminal alternately communicates directly with various other terminals so that different pairs of terminals are enabled to exchange information at the same time without signal interference from other terminals.

The information provided by the CPU 5 concerns the required beam direction and beam width. The beam width information supplied by the CPU 5 is based on information concerning the distance of terminal 1 with regard to terminal 2 as determined and provided by the distance determination means 20. In a preferred embodiment of the present invention, the beam width is set to a smaller value for a distance greater than a reference distance, and to a broader value for the distance falling short of the reference or critical distance.

Since a strong RF-signal is only available for the other terminal 2 being close by with no obstacles in-between, the distance determination is effectively derived from the strength of the RF-signal obtained at the RF-circuit 7. Further processing the RSSI value calculated from the RSSI unit 3 advantageously enhances the reliability of this distance estimation.

According to an advantageous development, the distance information is obtained by using an ultrasonic or optical distance measurement system, which allows a 'direct' distance measurement as compared to the above described distance determination by interpreting signal characteristics. The distance information can be enhanced by combining the results obtained from the different distance determination means just described in a way that similar results dominate the finally determined distance value.

In a further preferred development, the beam tracking is completely switched-off for the distance to the complementary communication terminal falling short of a predefined distance. The beam width #0' is in parallel hereto then set to a value sufficiently broad to cover the angular range required for the short-range communication at such a short distance. The radiation characteristic is in this case typically set to a hemispherical or omnidirectional characteristic. If the distance determination is not based on RSSI, Burst 2 can be omitted now, thereby increasing the speed of information transmission and decreasing the power consumption related to the beam tracking.

The processing steps required for a beam tracking with such a kind of relaxed requirements for the communicating terminals being arranged in close proximity are shown in FIG. 8. The procedural steps to be taken on terminal AP comprising the tracking system are arranged on the left side of the flowchart, those performed on the other terminal MT on the right side. The initial establishment of the communication (step S11) and the initial beam adjustment (step S12) is accomplished as in the prior art. The data transmitted in Burst 1 from terminal AP to terminal MT in step S13 are used on terminal MT to measure the RSSI value and FER for a transmission quality determination in step S14. Next, the data of Burst 2 are transmitted to terminal AP (step S15) and thereon used for RSSI and FER determination in step S16. In the same processing step, the current distance $\Delta d$ between the two terminals is determined which is then in step S17 compared with the reference distance. If the distance $\Delta d$ is found to be short of the reference distance, the HPBW of the beam is set to a wide angle #0' in step S18.1, else to a small angle #0 in step S18.2. In step S19 it is checked if the data transmission is to be continued, and on a positive check the method continues with step S13. In the other case, the method ends with the release of the communication link instep S110.

According to a preferred embodiment of the present invention, a movement monitoring means is used instead of basing the angular alignment of the main lobe on RSSI and possibly FER measurements. This allows to reduce the system overhead in the data bursts to a minimum value so that the alignment of the signal wave converter's directivity will not negatively affect the payload capacity of the bursts.

The movement monitoring means is preferably used for monitoring any movement of the mobile terminal 2. If the first terminal 1 is also subject to move, the monitoring means will likewise monitor the movements of this terminal. But for both cases, the relative movement of mobile terminal 2 is monitored with respect to the first terminal 1.

The movement monitoring means may use a GPS (Global Positioning System) for getting the position of the mobile terminal and/or the first terminal, if required. But the poor precision, which is currently achievable with GPS, makes it regularly unsuited for short-range wireless communications if no additional means to improve the precision are employed in addition. Short-range positioning systems like for instance indoor positioning systems are therefore preferred due to their higher precision.

In a further preferred embodiment of the present invention, sensor means located within the mobile terminal 2 and, provided that the first terminal 1 is also subject to move, likewise within this terminal are used to determine the movement of the two terminals relative to each other. The sensor means is adapted to sense physical quantities related to a movement and to provide one or more electrical output signals corresponding to the current values of the sensed physical quantities.

FIG. 9 shows an example for a sensor means according to the present invention using two different types of mechanical sensors, namely acceleration sensors 11-1 and 11-2, and gyroscope sensors 12-1 and 12-2 for enabling a respective motion tracing. Each individual sensor of a pair of the same type is oriented in a different, preferably orthogonal direction to the respective other in order to obtain the values of the same physical quantity for a different degree of freedom. Distinct from the example illustrated in FIG. 9 and depending on the types of sensors used, only one sensor may already be sufficient or more than two individual sensors of the same type might be required.

FIG. 7 shows a schematic representation of an example for a short-range wireless mobile communication system based on radio wave transmission, which has partly already been described with respect to a first aspect of the present invention explained further above. Therefore only the extension required for a movement means controlled directivity steering will be explained now.

The mobile terminal 2 houses the movement monitoring means 13 containing a pair of acceleration sensors 11-1 and 11-2 and a pair of gyroscope sensors 12-1 and 12-2. The movement monitoring means 13 provides tracking data to the CPU 10 (Central Processing Unit) of the mobile terminal 2. The tracking data contain information regarding the current movement of the mobile terminal 2. In a simple embodiment, the tracking data only represent the output of the sensors 11-1 to 12-2 in a digital format, which are then processed by the CPU 10 to calculate the movement of the mobile terminal 2 like e.g. current position, direction vector, velocity vector and acceleration vector or the like. The CPU 10 can thus be considered as an integral part of the movement monitoring means.

In a further advanced embodiment the movement monitoring means 13 pre-processes the data obtained from the sensor means thereby providing the CPU 10 with already derived data. The derived data represent a form of description of the current movement of the mobile terminal 2. The CPU 10 may use this data to calculate the most likely position of the mobile terminal 2 for the time of the next signal transmission to or from the first terminal 1. The CPU 10 supplies the tracking data or processed tracking data to the baseband circuitry 9, where they are integrated into a burst 2 as a steeling command, modulated on a radio frequency in the RF-circuitry 8, and finally transmitted via the antenna 2a to the first terminal 1.

The first terminal 1 receives the signal containing burst 2 via antenna 1a. After being demodulated in the RF-circuitry 7 and processed in the baseband circuitry 6, an RSSI value is determined on the base of the thus demodulated burst 2 in the transmission quality determination means 3. The CPU 5 of the first terminal extracts the steering command from burst 2 and a respective control signal is provided to the direction adjustment means 4 controlling the adjustable directional antenna 1a.

In an alternative embodiment of the present invention, the direction calculation is completely handled on the first terminal 1. From the mobile terminal 2 only data regarding the direction of the movement are received while the CPU 5 acting as a direction calculation means determines the required orientation of the directional antenna 1a for the next data transmission. By recording the past movement of the mobile terminal 2 for a certain period, the direction calculation means is also able to predict the next radiation angles of the antenna 1a required for signal transmissions in the near future through extrapolation.

If also the first terminal 1 is subject to move, the movement monitoring means additionally has to monitor the movement of this terminal, since the correct alignment of a directional antenna is a function of the relative movement of the linked terminals with respect to each other. The movement monitoring means 13 is hereto preferably composed of two components 13, one located on the first terminal 1 and the other on the mobile terminal 2. The motion related data are then exchanged between the two terminals and the received data are on each terminal used together with the data obtained from the local component 13 to monitor the relative movement and to calculate the steering command for the directional steering antenna. Of course, if only one terminal is equipped with a directional steering antenna, the calculation is limited to this terminal and the other terminal only has to transmit its motion related data.

FIG. 10 shows a frame structure for a beam tracking according to the second aspect of the present invention as it is preferably implemented by the system of FIG. 7. The upper frames are the ones to be transmitted by the first terminal 1; the lower frames are to be transmitted by the mobile terminal 2. The first data burst 1 transmitted by the first terminal 1 is received on the mobile terminal and used there to determine the RSSI value and the FER for the current beam direction—i.e. the current radiation angle of the directional antenna. The movement of the mobile terminal 2 is monitored simultaneously resulting in a generation of related tracking data or, like in the example given in FIG. 11, in a direct generation of a steering command. Following burst 1, the mobile terminal 2 transmits to the first terminal 1a second burst 2 containing the steering command. On the first terminal 1 the directional antenna is then realigned accordingly before the next data are going to be transmitted with burst 3 to mobile terminal 2.

As can be seen from the detailed illustration of in FIG. 11, burst 2 is composed of a preamble, the steering command and a payload. In a preferred embodiment of the present invention, the steering command consists only of four digits, namely b1, b2, b3, and b4, which represent the antenna realignment values as shown in Table 1 below.

A steering command according to the representation of FIG. 11 and Table 1 therefore contains only values for an incremental change in the azimuth $\Delta\phi$ and in the elevation angle $\Delta\theta$ of the antenna orientation. If no realignment is required, b1 like b2, b3 and b4=0. An incremental change in the positive direction is achieved for the azimuth with b1=0 and b2=1; for a change in the negative direction b1=1 and b2=0. Incremental changes of the elevation angle are controlled analogously.

TABLE 1

| b1 | b2 | Meaning | b1 | b2 | Meaning |
|----|----|---------|----|----|---------|
| 0 | 0 | No change on $\theta$ | 0 | 0 | No change on $\theta$ |
| 0 | 1 | $+\Delta\theta$ | 0 | 1 | $+\Delta\theta$ |
| 1 | 0 | $-\Delta\theta$ | 1 | 0 | $-\Delta\theta$ |
| 1 | 1 | Reserved | 1 | 1 | Reserved |

As the steering is based on the monitoring of the relative movement of the mobile terminal 2 with respect to the first terminal 1, the incremental changes $\Delta\phi$ and $\Delta\theta$ can be smaller than the HPBW of the directional antenna (see FIG. 16). FIG. 12 shows the beam directions obtained when based on an RSSI determination like in the prior art. The space covered in the example corresponds to a beam width of about 3 times the HPBW of the radiation characteristic and, as clearly visible, $\Delta\phi$ and $\Delta\theta$ are each identical to the HPBW employed. With the present invention $\Delta\phi$ as well as $\Delta\theta$ can be kept much smaller than the HPBW of the directional antenna used, thus enabling the utilization of mechanical steering antennas which would otherwise be too slow to perform a HPBW-sized $\Delta\phi$ and/or $\Delta\theta$ within the required time.

FIG. 13 shows the procedural sequence of a beam steering according to the present invention. The actions taken on the first terminal 1 are indicated on the left branch, the actions taken on the mobile terminal 2 are indicated on the right branch. The initial establishment of the communication (step S21) and the initial beam adjustment (step S22) is accomplished as in the prior art shown in FIG. 5. The data transmitted from the first terminal 1 (AP) to the mobile terminal 2 (MT) in step S23 are used on the mobile side to measure the RSSI value and FER for a transmission quality determination in step S24. From the simultaneous or subsequent sensor based measurement of the mobile terminal's 2 movement in step S25, the steering command is calculated in step S26 and transmitted to the first terminal 1 as described above.

There, the steering command is received in step S27 and the radiation angle of the steering antenna is correspondingly adjusted in step S28. If the data transmission is to be continued as checked in step S29, the next data are transmitted in the direction of the new radiation angle in step S23. Step S23 to S29 are repeated until the data transmission is to be discontinued resulting in a release of the communication link in step S210.

It is to be noted that, what has been described with respect to antennas for radio based short-range wireless communications is analogously applicable to electro-optical signal wave converters for a short-range optical communication. The principle of a mechanical steering antenna sometimes also called a mechanical beam steering antenna is shown in FIG. 15. The radiating element 1a—which can also be a reflecting surface for an optical beam antenna—can be tilted in one or in two orthogonal directions, depending on a tracking required only for one or for two dimensions. The tilt can e.g. be controlled by a servomotor, galvanometric drive or by any other means allowing a defined deflection.

An example for an adaptive antenna array is shown in FIG. 14. It usually consists of a regular arrangement of antenna elements 1a*, each of which is connected to the RF circuitry by a phase shifter 1a**. By suitably shifting the phase of the RF signal at each antenna element individually, a directional characteristic with a controllable radiation angle is obtained. For an optical adaptive signal wave converter, a transparent liquid crystal filled electrode which refractive index is controlled by an electric potential applied may for instance replace phase shifter and antenna element. Changing the refractive index of a respective electrode finally shifts the phase of the light passing through the electrode.

The reduction of the time required to accomplish the beam tracking for tracing a mobile terminal is to be looked at as the main advantage of the present invention. This is achieved by a distance sensitive beam width control in conjunction with a separate movement control. But furthermore, the present invention allows a finer graded realignment of a directional signal wave converter enabling a use of slow mechanical steering signal wave converters even for fast moving terminals.

The invention claimed is:

1. A terminal for a short range wireless mobile communication system, comprising
a directional signal wave converter; and
a controller configured to determine an optimum beam and to adjust said directional signal-wave converter to transmit/receive an information-carrying signal wave by said optimum beam;
the controller further configured to detect whether a distance between the terminal and a further terminal falls short of a predefined distance value;
the controller further configured to, when said distance falls short of said predefined distance value, determine a beamwidth so that the beamwidth is increased to a fixed beamwidth value, determine a set of allowed beam directions to comprise a unique beam direction, and determine the optimum beam as a beam having said fixed beamwidth value and said unique beam direction value; and
the controller configured to, when said distance does not fall short of said predefined distance value, determine a beamwidth according to a function which increases when the distance decreases, determine a set of allowed beam directions based on said beamwidth to comprise a plural number of allowed beam directions, said number decreasing when the beamwidth increases, and determine the optimum beam as a beam for which a reported quality is the highest according to a beam-tracking algorithm wherein, sequentially for each particular beam direction among said set of allowed beam directions, a burst is transmitted by a beam having said particular beam direction and said determined beamwidth and in response thereof a report including an indication of the quality of the beam is received from the further terminal.

2. The terminal of claim 1, wherein the beamwidth is a Half Power Beam Width.

3. The terminal of claim 2, wherein the fixed beamwidth value corresponds to an omnidirectional characteristic.

4. The terminal of claim 1, further comprising:
a distance determination means for determining the distance between the terminal and the further terminal.

5. The terminal of claim 4, wherein the distance determination means comprises an ultrasonic distance measurement system.

6. The terminal of claim 4, wherein the distance determination means comprises an optical distance measurement system.

7. The terminal of claim 4, wherein the distance determination means determines the distance between the terminal and the further terminal based on a Received Signal Strength Indicator value.

8. The terminal of claim 1, further comprising:
a mechanical steering for steering the radiation angle of the directional signal wave converter.

9. The terminal of claim 1, wherein the directional signal wave converter comprises an adaptive signal wave converter array.

10. The terminal of claim 1, wherein the signal wave converter on the terminal is configured to transmit and receive information in form of a radio wave and/or light wave.

11. A short range wireless mobile communications system including a first terminal and a second terminal each adapted for transmitting and receiving an information carrying signal wave, the first terminal being the terminal according to claim 1, and the second terminal being the terminal according to claim 1.

12. The system of claim 11, wherein the first terminal comprises a distance determination means.

13. The system of claim 11, wherein the first terminal is a stationary terminal.

* * * * *